United States Patent [19]

Shkedi et al.

[11] Patent Number: 4,987,782
[45] Date of Patent: Jan. 29, 1991

[54] CAPACITIVE PRESSURE TRANSDUCER SYSTEM

[75] Inventors: Zvi Shkedi, Worcester, Mass.; James S. Lepkowski, Glendale, Ariz.; Karl S. Pogany, Jr.; Gerald W. Meyer, both of Tucson, Ariz.

[73] Assignee: Allied-Signal Inc., Morris Township, Morris County, N.J.

[21] Appl. No.: 416,698

[22] Filed: Oct. 3, 1989

[51] Int. Cl.$^5$ .................. G01L 9/12; H03B 19/05
[52] U.S. Cl. ........................................ 73/718; 361/283
[58] Field of Search .................. 73/304 C, 398, 700, 73/708, 718, 724; 340/347 CC, 347 R, 870.37; 361/280, 283; 331/65, 135

[56] References Cited

U.S. PATENT DOCUMENTS

| | | |
|---|---|---|
| 3,581,238 | 5/1971 | Shimemura et al. .............. 331/135 |
| 3,595,084 | 7/1971 | Bailey et al. .................... 73/398 |
| 4,006,430 | 2/1977 | Meyer-Ebrecht ................ 331/65 |
| 4,227,419 | 10/1980 | Park ................................ 73/724 |
| 4,322,977 | 4/1982 | Sell et al. ....................... 73/701 |
| 4,398,194 | 8/1983 | Johnston ........................ 340/870.37 |
| 4,398,426 | 8/1983 | Park et al. ..................... 73/724 |
| 4,457,179 | 7/1984 | Antonazzi et al. ............. 73/701 |
| 4,644,798 | 2/1987 | Tamura et al. ................. 73/718 |
| 4,763,063 | 8/1988 | Shkedi ........................... 324/60 CD |

OTHER PUBLICATIONS

A. J. Testani, "Oscillator," IBM Technical Disclosure, Dec. 1973, pp. 2042-2044.

Primary Examiner—A. D. Pellinen
Assistant Examiner—Brian Johannssen
Attorney, Agent, or Firm—Robert C. Smith; Joseph R. Black; Robert A. Walsh

[57] ABSTRACT

A capacitive ratioing oscillator circuit utilizing a prior art pressure capsule, but through modification of the state variable oscillator circuit achieves a digital output which varies with the square root of the capacitance ratio C35 $C_p/C_r$. In this sensor the dielectric constant of the pressure media is measured in time with the pressure difference measurement. The oscillator includes a differentiator-inventor step herein each of capacitors $C_r$ and $C_p$ are connected to a common point and resistors are connected in parallel with each of said capacitors and with the common point connected to the inverting terminal of a first operational amplifier, a feedback line is connected from the output of the operational amplifier to the second resistor opposite the common point, first and second integrator circuits are connected to the output of said operational amplifier, a limit circuit is connected across the output of the second integrator circuit, and a feedback line is connected from the output of the second integrator circuit, and a feedback line is connected from the output of the second integrator circuit to the input of the inverter stage.

11 Claims, 2 Drawing Sheets

CAPACITIVE PRESSURE TRANSDUCER SYSTEM

This invention relates to a capacitive pressure transducer system and more particularly to such a system utilizing an oscillator in which the capacitances in a capacitive pressure transducer are incorporated into an oscillator circuit such that the period of the oscillator is equal to the square root of the ratio of two capacitances in the pressure transducer.

Analog and digital pressure transducers have been available for a number of years. A type of capacitive pressure transducer which has been available consists of a quartz capsule which includes two internal chambers with a pressure sensitive capacitor ($C_P$) in one chamber and a reference pressure capacitor ($C_R$) in a second chamber. Such prior art differential pressure transducers typically sense the ratio $C_P/C_R$ which is dependent on the sensed pressure differential and independent of the dielectric constant. Although the oscillator in a known prior art analog circuit has an output proportional to the capacitance ratio, the basic inductor-capacitor oscillator circuit does not have the high Q and frequency stability desired. Also, the accuracy of the sensor is somewhat reduced by errors in the analog to digital conversion which is usually required. In addition, the analog design has the disadvantage of using an auto-transformer which increases the size and weight requirements and reduces the reliability of the sensor.

A known prior art digital system uses the same capacitive pressure transducer but senses $C_P$ and $C_R$ independently by sequencing the switching of each capacitance into an astable multivibrator circuit whose oscillation frequency is equal to $\frac{1}{2}\pi R_T C$ where $R_T$ is a resistance varying with temperature which affects the dielectric constant. External circuitry is required to calculate the $C_P/C_R$ ratio needed to remove the effect of the varying dielectric constant. The accuracy of this method is limited by the difficulty of sensing the small change in capacitance of the reference capacitor. Furthermore, the update rate of the pressure system is restricted by the speed of the external ratio circuit and the time multiplexing of the capacity sensing oscillator. Also the additional circuitry required to calculate the capacitance ratio is a burden on system integration, especially for air data applications where computation time and memory are at a premium and need to be minimized.

Applicants have devised a circuit which avoids the above disadvantages and which further eliminates the effects of common mode error sources such as temperature and fluid dielectric constants. It utilizes the above described quartz capacitive pressure transducer in combination with a state variable oscillator which is somewhat similar to one which has been extensively published in the literature. Because the outputs of the integrators are 90 degrees out-of-phase, the circuit is sometimes referred to as a quadrature oscillator for the generation of sine and cosine waveforms. The circuit shown in the literature has a simple two resistor inverter stage instead of the bandpass filter or differentiator inverter that is required for Applicants' capacitance ratioing circuit.

Applicants' system utilizes a state variable oscillator consisting of two integrators followed by a differentiator inverter stage, in addition to an amplitude stabilization circuit. The amplitude stabilization circuit consists of transistor/diode clamps across the second integrator to prevent the operational amplifiers from saturating.

Figure 1:
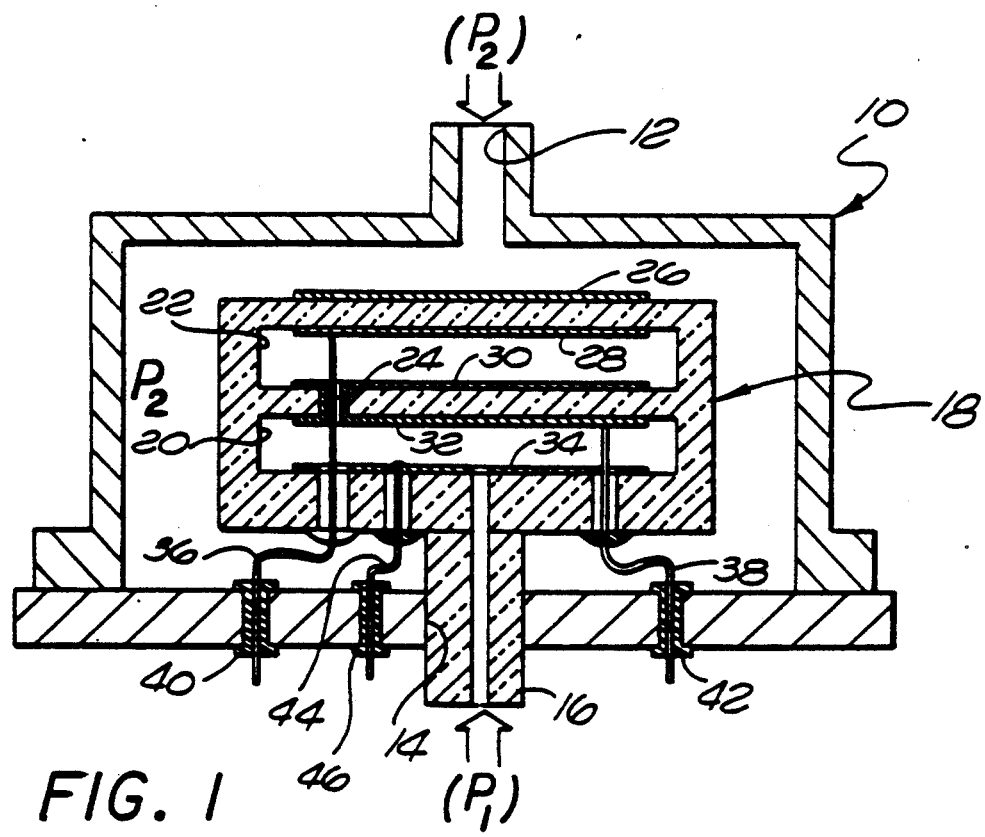
FIG. 1 is a sectional view, showing a differential pressure transducer of the type preferably used in and with our invention.

Referring now to FIG. 1, numeral 10 designates a housing having an opening 12 which is connected to a source of a fluid pressure to be measured and a second opening 14 receiving a quartz tube 16 connected to a reference pressure. Carried within said housing and spaced therefrom is a quartz capsule 18 which may be supported on quartz tube 16 which communicates with one of two chambers 20 in capsule 18. A second chamber 22 communicates through a port 24 with chamber 20. A plurality of metal films 26, 28, 30, 32 and 34 are formed on surfaces of capsule 18 with films 30 and 32 connected together. A reference pressure $P_1$ is communicated with the interior of the capsule 18 through tube 16 and is sensed by means of the capacitor formed by metal films 30, 32 and 34 and the air space between them. Metal films 30, 32 are connected to a wire 38 fed through an insulator 42 in housing 10 and film 34 is connected to a wire 44 fed through an insulator 46. This reference pressure $P_1$ is essentially unvarying except for the temperature and dielectric effects within housing 10. The sensed pressure $P_2$ communicates with the interior of housing 10 through opening 12 and is imposed on the exterior of quartz capsule 18. The pressure sensing capacitor Cp consists of metal films 28, and 30, 32 and the space between them. Electrical wires 36 and 38 are connected to metal films 28 and 30, 32 respectively and pass through insulated connectors 40 and 42, respectively. Since the applied pressure $P_2$ acts on the outside of capsule 18 and the reference pressure $P_1$ is inside, the capacitance $C_p$ is a function of the differential pressure $P_2 - P_1$ and the dielectric constant K. The capacitance of $C_R$ (films 32, 34 and the space between) varies only with K. K varies as a function of temperature, humidity and fluid density.

Referring to FIG. 1, $C_P$ is formed between insulated connectors 40 and 42. $C_R$ is formed between insulated connectors 42 and 46. The oscillator circuit forms the ration ($C_P/C_R$) which cancels the variation of K in both $C_P$ and $C_R$.

Figure 2:
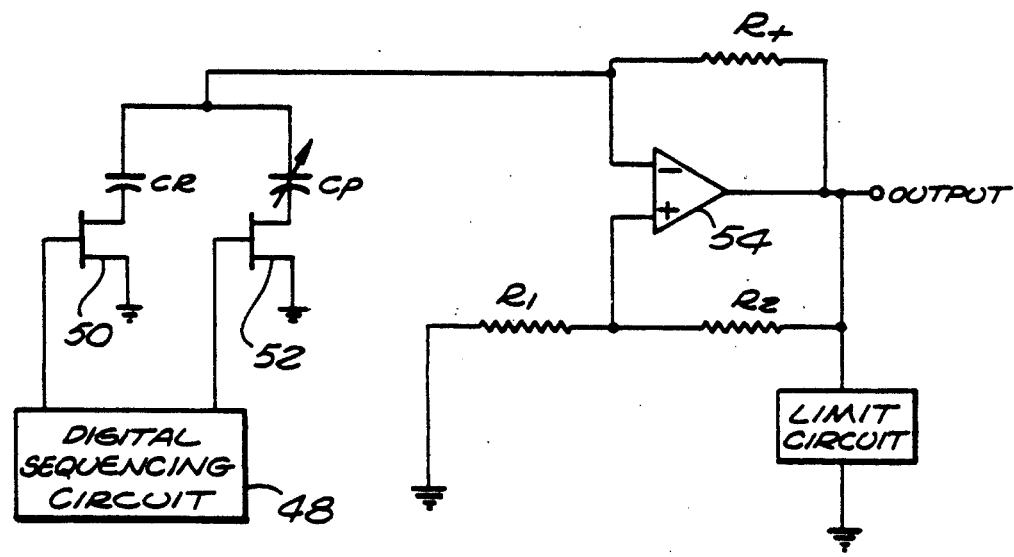
FIG. 2 is a schematic circuit diagram of a prior art digital sensing circuit used in combination with the differential pressure transducer of FIG. 1.

FIG. 2 is a simplified schematic drawing of a prior art digital capacitive pressure sensor. In this circuit the capacitance of $C_P$ and $C_R$, which may be obtained from capsule 18, are sensed independently by means of a digital sequencing circuit 48 including field effect transistors 50 and 52 connected to an operational amplifier 54 which alternatively switches each capacitance into an external circuit. External circuitry is needed to calculate the $C_P/C_R$ ratio needed to remove the effect of the varying dielectric constant and this external circuitry is a burden on system integration.

Figure 3:
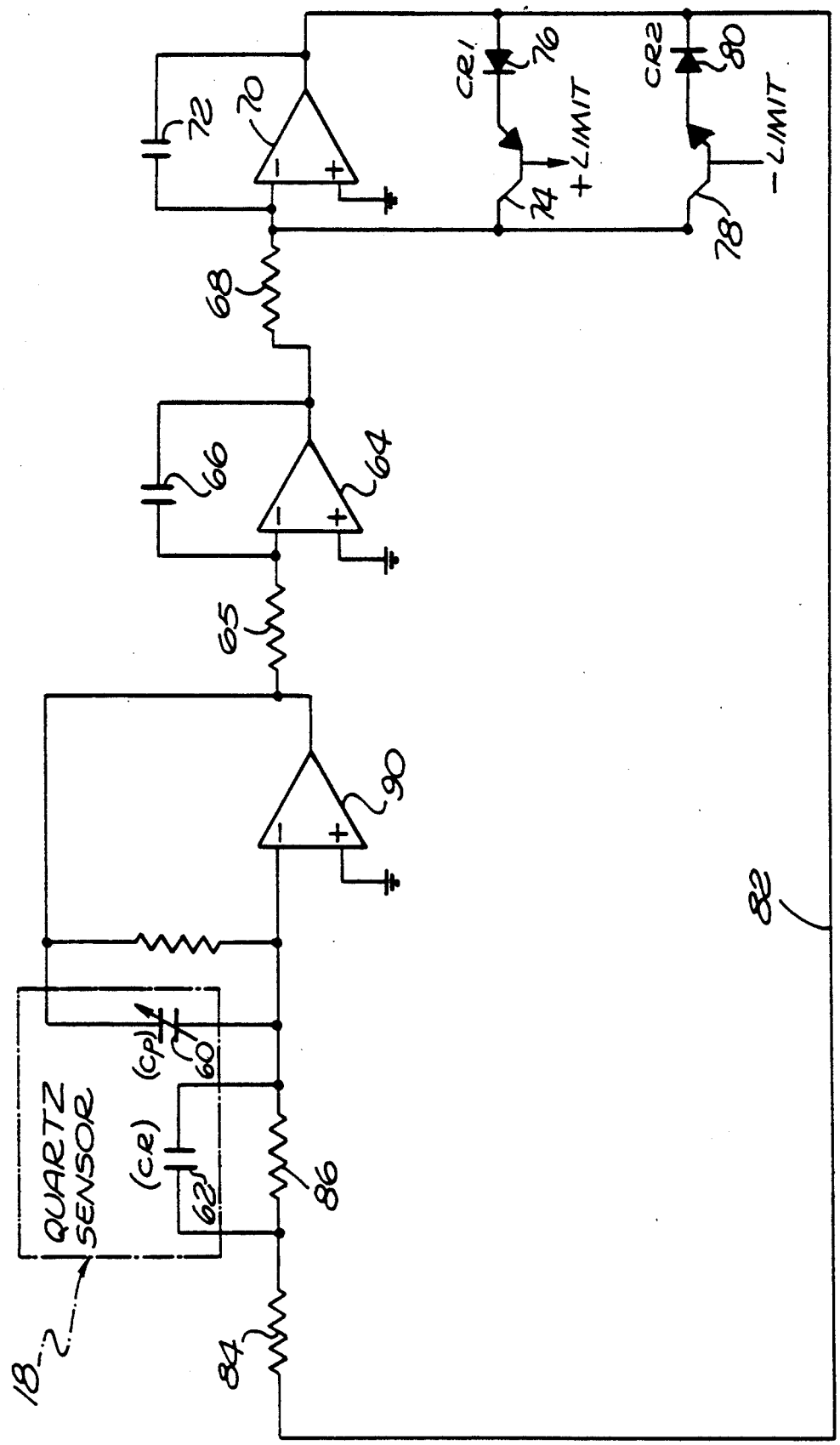
FIG. 3 is a schematic circuit diagram of an oscillator circuit used in our capacitive pressure transducer system.

Applicants' oscillator circuit is shown in the schematic diagram of FIG. 3. In this circuit capacitors $C_P$ and $C_R$ which are shown in quartz capsule 18, appear at numerals 60 and 62 respectively. Capacitors 60 and 62 are part of an oscillator circuit which consists of two integrators followed by a differentiator inverter stage, in addition to an amplitude stabilization circuit. Each integrator has a phase delay of approximately 90 degrees and the inverter stage adds a delay of approximately 180 degrees. When a total phase delay of approximately 360 degrees is fed into the input of the first integrator, the circuit oscillates. The first integrator consists of an operational amplifier 64 having an input resistor 65, and a capacitor 66 connected across it. This integrator is connected through a resistor 68 to a second integrator consisting of an operational amplifier 70 having a capacitor 72 connected thereacross. Resistor-capacitor combinations 65, 66 and 68, 72, respectively, set the gain of each integrator stage in addition to setting the oscillation frequency. An amplitude limiting circuit, which prevents the operational amplifiers from saturating, is also connected across amplifier 70 and includes a transistor 74 with a diode 76 to set the positive limit and transistor 78 and diode 80 to set the negative limit. Connected to the output of operational amplifier 70 is a line 82 connected to one side of capacitor 62 through a resistor 84. Connected in parallel with capacitor 62 (CR) is a resistor 86 which provides a DC current path through capacitor 62 in order to initiate oscillation at power-up. Connected across capacitor 60 and an operational amplifier 90 is a resistor 88. This resistor 88 and resistor 86 may each be replaced with a resistance "T" network, if desired. Applicants have found that the resistance "T" networks, although not required, tend to reduce the sensitivity of the oscillator to changes in values of components, particularly resistor 86 which, in the FIG. 3 embodiment, is of large value (20M ohms). The values of resistors 84 and 88 are selected to set the break frequencies of the filter to provide a phase delay of slightly more than 180 degrees to insure oscillation start up. A terminal common to one side of resistors 86 and 88 and capacitors 60 and 62 is connected to the inverting terminal of an operational amplifier 90, which, together with resistors 84, 86 and 88 and capacitors 60 and 62 constitute the differentiator inverter stage.

The equation for the period of oscillation is:

$$P = 2\pi \sqrt{R_{65}R_{68}C_{66}C_{72}\left(\frac{R_{84}C_{60}}{R_{86}C_{62}} + \frac{C_{60}}{C_{62}} + \frac{R_{84}}{R_{88}}\right)} \quad (1)$$

where $C_{62}$ and $C_{60}$ are the pressure capacitances. If $R_{86}$ is much greater than $R_{84}$ and $R_{88}$ is much greater than $R_{84}$, the effect of $R_{84}$, $R_{88}$ and $R_{86}$ is negligible. Thus the equation can be simplified to:

$$P = 2\pi \sqrt{R_{65}R_{68}C_{66}C_{72}\left(\frac{C_{60}}{C_{62}}\right)} \quad (2)$$

If $R_{65} = R_{68}$ and $C_{66} = C_{72}$, then equation (2) can be written as:

$$P = 2\pi RC\sqrt{\frac{C_{60}}{C_{62}}}$$

where the period of oscillation is proportional to the square root of the pressure capacitance ratio, since the factor $2\pi$ RC may be considered as a constant (K).

Thus it will be recognized that Applicants have devised an oscillator circuit in which the frequency of oscillation is a function of the ratio of two capacitances. This oscillator is incorporated into a sensor in which one of the capacitors is variable in response to an external stimulus such as fluid pressure. The capacitance of the capacitors are also sensitive to common mode stimuli that act as error sources, e.g. temperature and fluid dielectric constant. Since the output signal of the circuit is a function of common mode error sources is negated as indicated by the follow equations:

$$CP = C_{PO} \cdot (1 + E) \cdot f(T)$$

$$CR = C_{RO} \cdot (1 + E) \cdot f(T)$$

$$P = K \cdot \sqrt{C_P/C_R} = K\sqrt{C_{PO}/C_{RO}}$$

where:

$C_{PO}$ is the basic pressure dependent capacitance, excluding error sources.

$C_{RO}$ is the basic reference capacitance excluding error sources.

E is the dielectric constant of the fluid.

From the foregoing it will be recognized that the oscillator and sensor described herein provides substantial benefits in that it enables the provision of a pressure sensor which is inherently corrected for common mode errors without the need for additional circuitry to provide correction means.

We claim:

1. A capactive pressure transducer system including a capsule within a chamber and having a housing and a plurality of parallel surfaces within an exterior of said housing, metal films on said surfaces and electrical leads connecting certain of said films to produce a first capacitance $C_R$ which is exposed to a reference pressure and a second capacitance $C_P$ which is exposed to a variable pressure, characterized in that said capacitance $C_R$ and said capacitance $C_P$ are connected into an oscillator circuit wherein said capacitances are both connected to means at a common voltage level, a first resistor is connected across said capacitance $C_P$, a second resistor is connected across said capacitance $C_R$, a first operational amplifier has its inverting input terminal connected to said common voltage level and its opposite input terminal connected to ground with the output of said first operational amplifier connected through a resistor to the inverting terminal of a second operational amplifier and to the opposite side of said first resistor, a capacitor connected across said second operational amplifier, a third operational amplifier having its inverting input terminal connected through a resistor to the output of said second operational amplifier and a capacitor connected across said third operational amplifier, a limit circuit connected across said third operational amplifier and a resistor connected from the output of said third operational amplifier to the side of said capacitance $C_R$ opposite said means at a common voltage level, such that the period of oscillation of said oscillator is proportional to the square root of the ratio of capacitance $C_P$ over capacitance $C_R$.

2. A capacitive pressure transducer system comprising a differential pressure transducer including a first capacitor $C_R$ exposed to a reference pressure and a second capacitor $C_P$ exposed to a variable pressure, characterized in that said system comprises an oscillator including a differentiator-inverter stage wherein each of said capacitors $C_R$ and $C_P$ are connected to a common point and first and second resistors are connected in parallel with each of said capacitors with said common point connected to the inverting terminal of a first operational amplifier, a feedback line connected from the output of said first operational amplifier to said second resistor opposite said common point, first and second integrator circuits connected to the output of said first operational amplifier, a limit circuit connected across the output of said second integrator circuit, and feedback means connected from the output of said second integrator circuit to the input of said inverter stage, such that the period of oscillation of said oscillator is proportional to the square root of the ration $C_P/C_R$.

3. An oscillator circuit including a differentiator-inverter stage, a first integrator connected to said differentiator-inverter stage, a second integrator connected to said first integrator and an amplitude stabilization circuit connected across said second integrator with feedback means connected from the output of the second integrator to the input of said differentiator-inverter stage, said differentiator-inverter stage comprising an input resistor, a first capacitor with a second resistor in parallel with said capacitor and in series with said input resistor, a second capacitor connected to a common voltage point with said first capacitor opposite said input resistor, and a third resistor in parallel with said second capacitor and connected to said common voltage point, an operational amplifier having its inverting input connected to said common voltage point and feedback means connecting the output of said operational amplifier to said third resistor opposite said common voltage point, such that the period of oscillation of said oscillator is proportional to the square root of the ratio of the capacitance of said first capacitor to the capacitance of said second capacitor.

4. An oscillator circuit as claimed in claim 3 wherein said amplitude stabilization circuit consists of transistor/diode clamps connected across said second integrator.

5. An oscillator circuit as claimed in claim 3 wherein each of said first and second integrators includes an operational amplifier with an input resistor connected to the inverting terminal of said operational amplifier and a capacitor connected across said operational amplifier and wherein said input resistor and capacitor for each operational amplifier are chosen to set the gain of its integrator stage.

6. An oscillator circuit as claimed in claim 3 wherein said input resistors for each of said operational amplifiers in said integrators are of the same resistance value and said capacitors connected across each of said operational amplifiers are of the same capacitance value.

7. An oscillator circuit as claimed in claim 3 wherein said second and third resistors are substantially larger in resistance value than said input resistor to said inverter stage.

8. A capacitive pressure transducer system including a capsule within a chamber and having a housing and a plurality of parallel surfaces within and exterior of said housing, metal films on said surfaces and electrical leads connecting certain of said films to produce a first capacitance $C_R$ which is exposed to a reference pressure and a second capacitance $C_P$ which is exposed to a variable pressure, characterized in that said system comprises an oscillator including a differentiator-inverter stage wherein each of said capacitors $C_R$ and $C_P$ are connected to a common point and first and second resistors are connected in parallel with each of said capacitors with said common point connected to the inverting terminal of a first operational amplifier, a feedback line connected from the output of said first operational amplifier to said second resistor opposite said common point, first and second integrator circuits connected to the output of said first operational amplifier, a limit circuit connected across the output of said second integrator circuit, and feedback means connected from the output of said second integrator circuit to the input of said differentiator-inverter stage, such that the period of oscillation of said oscillator is proportional to the square root of the ratio $C_P/C_R$.

9. A capacitive pressure transducer system as claimed in claim 8 wherein said limit circuit consists of transistor/diode clamps connected across said second integrator.

10. An oscillator circuit including a differentiator-inverter stage, a first integrator connected to said differentiator-inverter stage, a second integrator connected to said first integrator, and an amplitude stabilization circuit connected across said second integrator with feedback means connected from the output of the second integrator to the input of said differentiator-inverter stage, said differentiator-inverter stage comprising an input resistor, a first capacitor with a second resistor in parallel with said capacitor and in series with said input resistor, a second capacitor connected to a common voltage point with said first capacitor opposite said input resistor, and a third resistor in parallel with said second capacitor and connected to said common voltage point, an operational amplifier having its inverting input terminal connected to said common voltage point and feedback means connecting the output of said operational amplifier to said third resistor opposite said common voltage point, one of said capacitors being subject to variation in its capacitance value and said first and second capacitors being maintained at essentially identical temperature, such that the period of oscillation of said oscillator is proportional to the square root of the ratio of the capacitance of said first capacitor to the capacitance of said second capacitor.

11. An oscillator circuit as claimed in claim 10 wherein said first and second capacitors are physically incorporated in pressure transducer means with one of said capacitors being exposed to a reference pressure and the other of said capacitors being exposed to a variable pressure.

* * * * *